July 7, 1959  J. W. SHERIDAN  2,893,288
PORTABLE EYE-TESTING APPARATUS
Filed July 1, 1955  6 Sheets-Sheet 1

INVENTOR.
John W. Sheridan
By George F. Westerman
ATTORNEY

July 7, 1959 J. W. SHERIDAN 2,893,288
PORTABLE EYE-TESTING APPARATUS
Filed July 1, 1955 6 Sheets-Sheet 3

INVENTOR.
John W. Sheridan
BY
ATTORNEY

July 7, 1959

J. W. SHERIDAN 2,893,288

PORTABLE EYE-TESTING APPARATUS

Filed July 1, 1955

INVENTOR.
John W. Sheridan
By George F. Westman
ATTORNEY

United States Patent Office 2,893,288
Patented July 7, 1959

2,893,288
PORTABLE EYE-TESTING APPARATUS
John W. Sheridan, Silver Spring, Md.
Application July 1, 1955, Serial No. 519,685
3 Claims. (Cl. 88—22)
(Granted under Title 35, U.S. Code (1952), sec. 266)

The invention described herein may be manufactured and used by or for the Government for governmental purposes without the payment of any royalty thereon.

The present invention relates to an apparatus for testing vision and other physiological functions related to eyesight, and more particularly to a portable apparatus incorporating interchangeable lens cartridges and targets which permit testing visual acuity and ability of an individual to perform visual tasks at varying distances.

Present instruments have fixed lens systems which provide for near vision testing at 13 inches, and distant vision testing at infinity, regardless of whether the distance targets are calculated at 20 feet or at 26 feet. The instant device satisfies a long-felt need for a vision-testing device for industrial, military, and professional use for general eye testing such as with a Snellen chart, evaluating visual tasks and the ability of individuals to perform such tasks at various distances. The instant apparatus incorporates structural features and optical principles which lend flexibility and provide a vision-testing apparatus which may, by means of interchangeable lens and target elements, be set to test visual functions for near and far work distances of 8 inches to 40 inches and 20 or 26 feet, respectively, and permit use of lens elements corresponding to particular target elements so that it is possible to view targets of equal magnification for both far and near testing without the necessity for displacing targets or varying their distances from the viewer.

The instant device further distinguishes over present devices in that the lens elements are mounted on a rotor assembly which is a complete unit in a cartridge form so that the lens element may be quickly changed for conducting tests at various work distances. The rotor assembly permits particular optical elements of the system to be quickly changed from a lens system for near vision testing to one for far vision testing using either the same target of a particular magnification, another target of a different magnification and character, or monocular and binocular targets. The interchangeable target feature permits not only carrying out general vision tests but also such other tests as depth perception, color perception, and other visual acuity tests. The structure of the apparatus is such that technicians and personnel in industrial organizations concerned with conducting vision tests can with little training conduct the required tests by asking a series of questions of the person tested based on a predetermined testing sequence, recording the answers, and determining the examinee's instrument test score. The tests are based on specifications and directions drawn up by professional specialists and working groups in the field of vision testing. By virtue of the interchangeability of the lens and target elements, the apparatus may be employed in conducting improved tests as they are developed in keeping with the ever increasing severity of visual demands arising in both industrial and military fields. The portability of the apparatus is due principally to the novel optical system employed in the apparatus embodying a removable lens rotor system which makes possible far as well as near vision testing permitting the use of a compact apparatus which may be readily carried from place to place or may be set on a desk, tabletop, or tripod when tests are given, thus eliminating the need for specially equipped eye lanes for conducting visual acuity tests.

It is a principal object of the instant invention to provide a portable eye-testing apparatus embodying interchangeable lens systems and interchangeable targets for near and far point vision testing with a fixed target distance.

It is a further object of the present invention to provide a portable apparatus which may be adapted for testing visual functions for far and near point work distances wherein the far and near point lens systems and the target elements are carried by rotor assemblies for rapid changing.

It is a further object to provide an eye tester wherein a fixed target distance may be employed for far as well as near point vision testing through use of interchangeable lens rotor assemblies which effect an optical compensation between lens separation and target separation by use of a compensating optical wedge and decentered optical elements.

It is a further object of the present invention to provide an eye-testing apparatus wherein the latitude of work distances for various visual tasks to be tested may be quickly varied through employment of interchangeable rotor assemblies for carrying far and near point lens systems and targets.

It is a further object of the present invention to provide a portable, rugged, and compact eye-testing apparatus wherein the selection of a far and near point lens system and target may be quickly accomplished by rotation of portions of a unitary interchangeable assembly which requires a minimum of maintenance and the criticality of adjustment is not disturbed by virtue of maintenance operations and interchangeability.

It is a further object of the present invention to provide a portable eye-testing apparatus wherein the far and near point lens system and the target elements are in cartridge form permitting rapid insertion and removal from the apparatus.

It is a further object of the present invention to provide a portable eye-testing apparatus which is sufficiently compact to be used on a table, desk top, tripod, or at a particular work site for testing far and near point vision and visual acuity, and which may be adapted for a wide variety of work distances by means of interchangeable lens systems and targets.

It is a further object of the instant invention to provide a lens system for an eye-testing apparatus which quickly adapts the apparatus for various work distances by combining in a unitary assembly a near and far point lens system and an element for optical compensation of lens separation and target separation.

It is a still further object of the instant invention to provide in an eye-testing apparatus, a lens system in a unitary assembly for far and near point visual testing including a compensating element to permit maintaining the target element at a fixed distance from the lens system for both far and near point tests.

It is a further object of the instant invention to provide an eye-testing device including an adjustable, counterbalanced headrest to accommodate persons wearing bifocal glasses.

Other objects and advantages of the instant invention will be apparent from the following description taken in connection with the accompanying drawings, in which—

The description of the optical elements of the lens rotor assembly will be based on the use of 5 diopter positive focal length or converging distance lenses for distance phoria and 3 diopter positive focal length for converging near point lenses optically simulating a visual task distance of 13 inches. It should be understood that near point lenses for optically simulating a variety of visual task distances in addition to the 13 inches above such as 8, 20, 25, 30, and 40 inches, may be accomplished by substituting lens assemblies of similar structure but varying in optical design consistent with the desired work distance in place of the unit for the 13 inch work distance in the space provided in the apparatus for the lens rotor assemblies. The principles and calculations underlying the novel optical system of the instant invention will be described hereinafter.

The eye tester of the instant invention principally comprises a viewing box with a headrest exteriorly attached, a lens rotor unit, a target unit, and a light chamber, the latter three portions of the apparatus arranged in separate sections of the viewing box, a voltage supply and control means, and a base member on which the viewing box may be raised or lowered. The individual elements of the eye tester will be described in greater detail as to construction and relative cooperation hereinafter.

Figure 1:
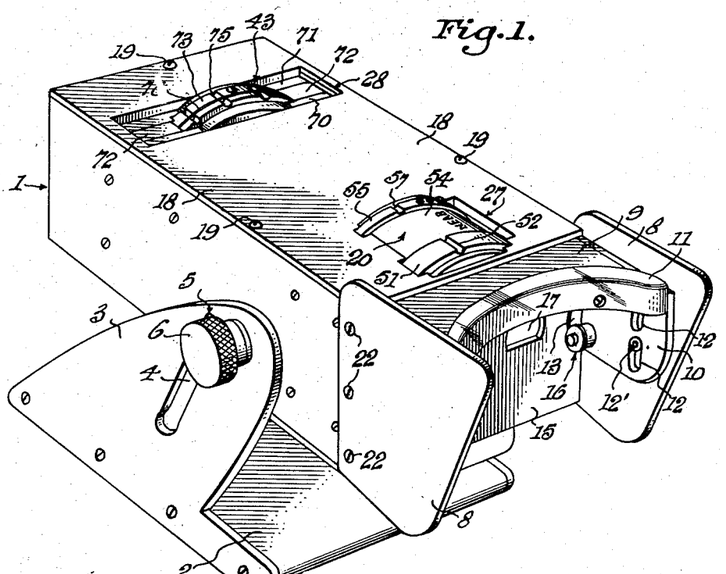
Fig. 1 is a perspective view of a preferred assembled embodiment of the instant invention in an elevated position above a supporting base.

Reference is now made to Fig. 1 in which the viewing box shown generally by 1 is supported in an elevated position above the base 2 which has upstanding rigid portions 3 provided with a slot 4 having an offset portion 5 at the upper end thereof. The viewing box is held at various heights above the base or tilted at any desirable angle by means of the milled head bolt 6 which threadably engages the viewing box 1 and rides in the slot 4 to permit the apparatus to be locked in position at various angles and heights above the base for desk or tabletop use. When it is desired to use the device for testing individuals in standing position, the viewing box 1 may be removed from the base 2 and mounted on a tripod stand by means of a threaded hole 7 in the bottom of the viewing box. The unique construction of the instant device makes possible a smaller size than is presently available for eye-testing devices, which is particularly advantageous for shipping and carrying the instrument about when conducting tests. One embodiment of the viewing box of the instant device measured 11¼" x 6½" x 4¾". When used with the base shown in Fig. 1, the maximum height in the fully elevated position is 14⅜", and when in the lowest position on the base 2, the overall dimensions are 15¾" x 9⅜" x 8½". The apparatus preferably is made of aluminum, but may be made of other suitable material and may employ welded construction or other suitable means for fastening the portions of the viewing box, base and transverse partition portions. Various portions may be cast as integral units, further simplifying assembly.

Figures 3, 4:
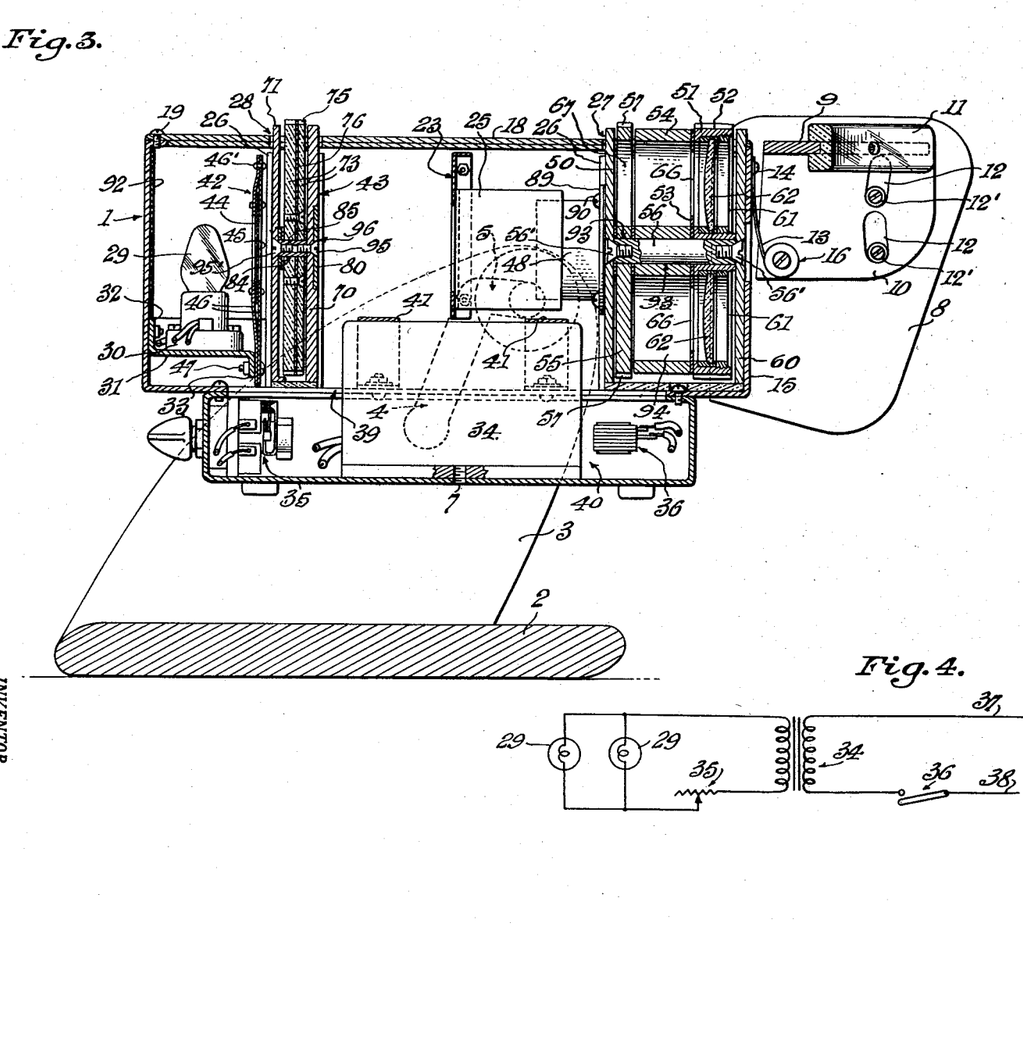
Fig. 3 is a central vertical sectional view of the embodiment of Fig. 1 showing details of the lens and target elements, headrest, and electrical components.
Fig. 4 is a circuit diagram of the electrical components used in the instant eye-testing apparatus.

The headrest, which is mounted for up and down movement between the light shields 8, includes a top plate 9, side plates 10, and a member 11 attached to top plate 9. The light shields 8 may be secured to the viewing box 1 by screws 22, or any other suitable fastening means or may be formed integral with the box 1. The member 11 may be made of any material, such as plastic, which may be shaped or molded to conform to individual forehead contours. Each of the side plates 10 is provided with arcuately shaped slots 12 into each of which a stud 12' projects and which may have a ball bearing structure permitting the headrest to be moved up and down in an arcuate path of about 7° of arc, particularly to accommodate persons wearing bifocal glasses to line up different segments of their glasses with the optical system of the eye tester device. The headrest may not only be moved up and down, but will also remain in any position to which it is moved because of the use of Negator springs 13 which are well known and form no part of the instant invention, but have such properties as to attain this result. Negator springs are made of flexible metal strips which have a slight concavity in a transverse direction. One end of the Negator spring is secured in any suitable manner as at 14 on an upper corner of the front plate 15 of the view box 1. The other end of the spring 13 is rolled on a spindle-type roller 16 which is attached to the lower inner corner of the side plate 10. There are two such springs used, similarly fastened, one on each side of the headrest.

Figure 2:
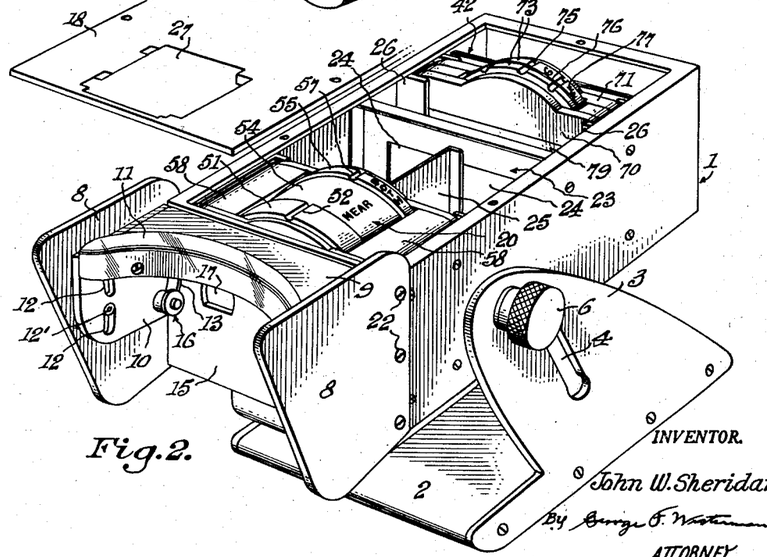
Fig. 2 is a perspective view of the embodiment shown in Fig. 1 with the cover removed showing the interior of the testing apparatus of the instant invention particularly the relative location of the lens and target elements.

As previously explained, the viewing box 1 may be cast, stamped or extruded out of a single piece of material, or built up of removable sections as illustrated in the embodiment shown, for example, in Figs. 1 and 2. The front plate 15 is provided with viewing apertures 17 which are aligned with the openings in the lens unit assembly and the target unit, both of which will be hereinafter more fully described. The viewing box 1 is also provided with a removable cover 18 which may be secured by bolts 19, as shown, or in any suitable manner which permits quick removal to insert different lens and target units such as a hinged cover with a snap or friction type catch. The cover 18 has openings 27 and 28 for the lens and target units, respectively, to project through so that the lens and target units may be manually rotated for a purpose to be hereinafter described. In Fig. 2, there is shown a view of the interior of the viewing box 1 with the cover 18 removed. The lens unit assembly shown generally at 20 is held in fixed position in the viewing box 1 by means of guide members 21, more clearly shown in Fig. 14, which allow the lens units to be quickly slid out of the apparatus when a different lens unit assembly is to be inserted. Directly behind the lens unit assembly is a transverse septum member 23 provided with openings 24 in line with the individual sight paths through the lens unit to the target unit. The septum 23 has a partition 25 secured centrally thereof which extends in a plane normal to the septum 23. Channel-shaped guides 26 are fastened in any suitable manner to the interior walls of the view box 1 at a predetermined distance from the objective end of the lens unit, and like the lens unit, permits easy replacement of target units when a variety of indicia are desired for various visual acuity tests. A major distinction over present eye testers and one of the main points of novelty of the instant device is that the lens assembly used herein is compensated so that the target remains at a fixed distance from the lens unit regardless of whether the near or far point lens system is used. A more detailed description of the target assembly shown generally at 43 will be given hereinafter. A compartment at the rear of the viewing box 1 houses a light source which includes a pair of 7-watt miniature bulbs 29 mounted in vibration absorbing sockets 30. The sockets 30 are carried by a shelf 31 havnig oppositely turned flanges 32 and 33, respectively, for securing the shelf 31. It is to be understood that other light sources having the requisite characteristics for conducting tests may be substituted for the bulbs 29. A constant voltage transformer 34 supplies electrical energy for the bulbs 29 which are connected in parallel across the transformer output as shown in the wiring diagram, Fig. 4. A rheostat shown generally by 35 in the output of the transformer, permits changes to be made in the level of illumination. A toggle switch 36 turns the current on or off when the transformer is connected through leads 37 and 38 to a source of voltage. A constant voltage transformer is employed since it is essential that a uniform level of illumination be maintained even though the source voltage varies. The bottom of the viewing box is provided with an opening 39 to permit the transformer 34 to project partly into the viewing box 1 and partly into a chamber 40 attached in any suitable manner to the bottom of the viewing box 1. The chamber 40 also houses the rheostat 35 and the toggle switch 36. A pair of straps 41 secured at the ends thereof to the bottom of the viewing box, pass over the transformer 34 and hold it in a fixed position. The interior walls of the light chamber may be provided with a coating 92 or a layer of material having a high light reflection factor to insure a level of illumination averaging 9–15 foot lamberts which is the degree of illumination recommended by the National Research Council—Vision Committee, for vision testers. The interior of the tester forward of the target unit is darkened so that the subject tested receives no visual stimulation apart from the test being presented. A light diffusing screen shown generally at 42 is supported as at 47 by the flange 33, and separates the light source 29 from the target unit 43. The diffuser 42 comprises parallel screens 44 and 45 facing the light source and the target unit, respectively. The screen 44 facing the light source preferably is a daylight screen and the screen 45 facing the target unit is of translucent material to diffuse the light transmitted to the target unit. The screens 44 and 45 are secured in face relation between metal frame members 46 which latter are fastened together by rivets 46' or other suitable means.

Figures 5, 14:
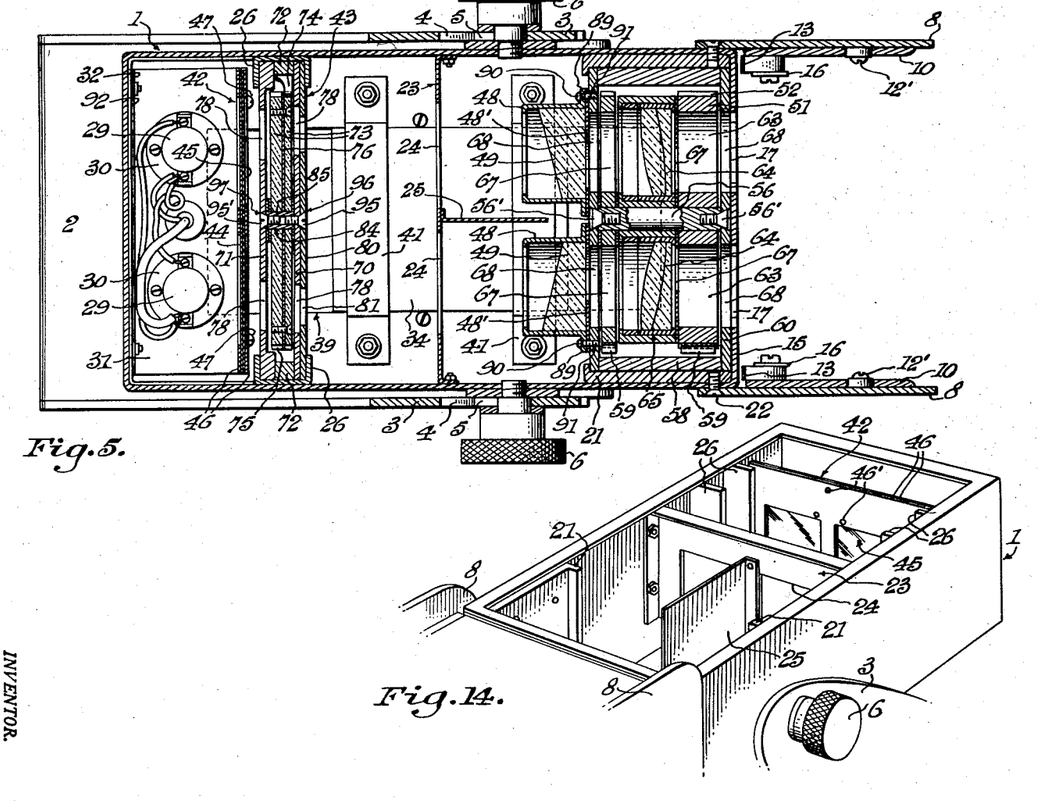
Fig. 5 is a central horizontal sectional view of the preferred embodiment of the instant invention shown in Fig. 1.
Fig. 14 is a perspective view of a portion of the housing of the eye tester with the lens and target units removed to show the transverse partitions and artificial light diffuser screen.
Figures 6, 7:
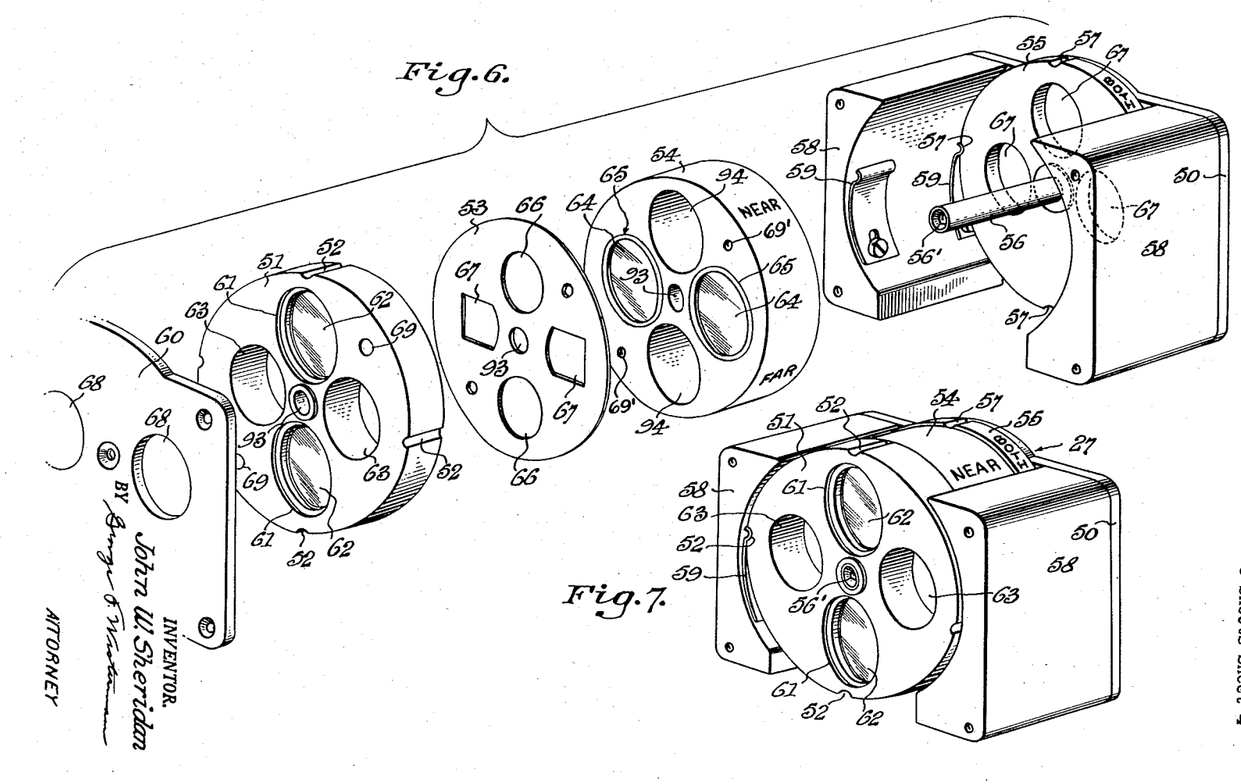
Fig. 6 is an exploded view of a lens assembly with the near lens pair rotated into position in the lens assembly for viewing the target.
Fig. 7 is a perspective view of a lens unit in assembled condition.
Figures 8, 9, 10:
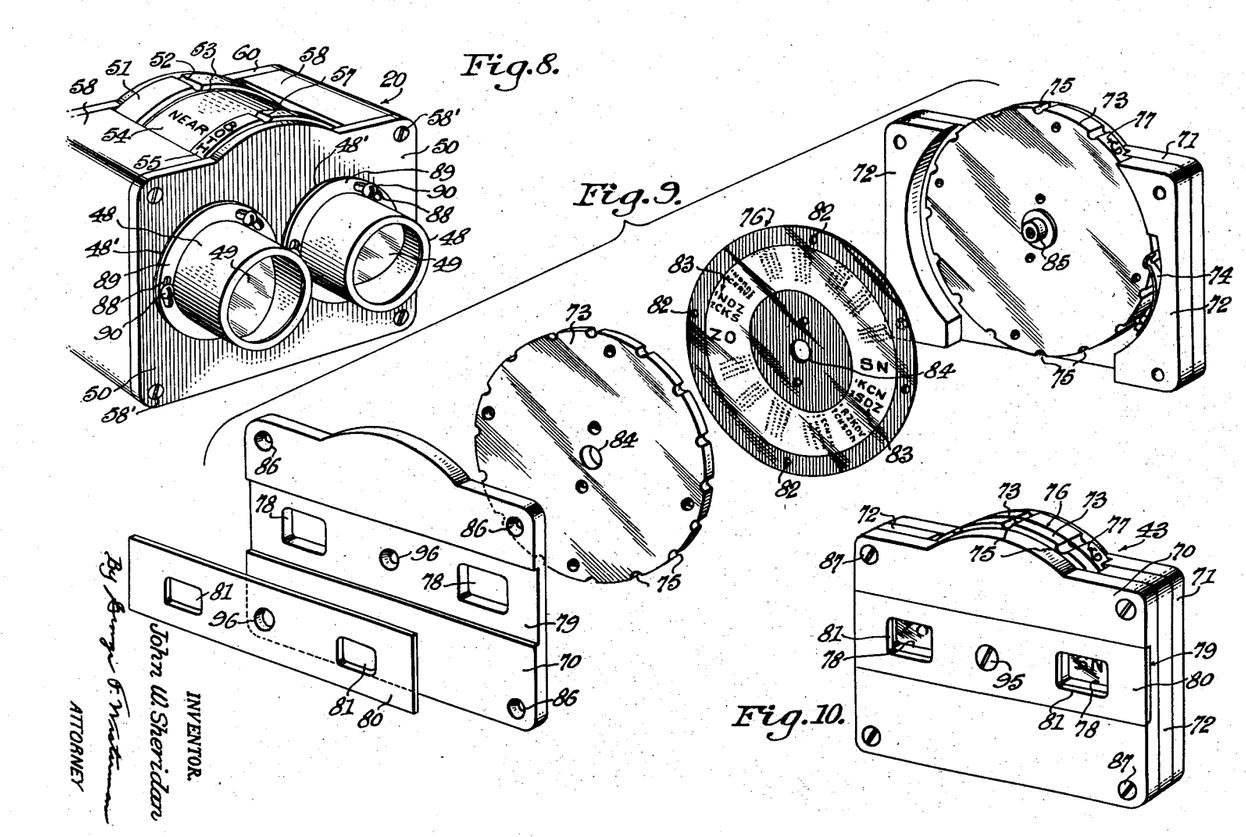
Fig. 8 is a perspective view of an assembled lens unit showing the barrels carrying the compensating wedge elements.
Fig. 9 is an exploded view of a target unit.
Fig. 10 is a perspective view of a target unit in assembled condition.

Reference is now made to the lens rotor assembly as illustrated in the exploded view in Fig. 6 and the assembled condition in Fig. 7. The views in Figs. 5 and 8 show the barrels 48 holding the wedge elements 49 which are carried by the plate 50 of the assembly adjacent the target unit. The barrels 48 may be rotated for orienting the wedges 49 by means of the slots 88 in the flanges 89 of the barrels 48 and secured in fixed position by bolts 90 engaging threaded holes 91 in plate 50. A mask 48' is placed behind the prism 49 to reduce reflected glare. As previously described, the entire lens rotor assembly as shown in Fig. 7 may be inserted in or removed as a unit from the front section of the viewing box 1. This novel feature permits conducting visual tests at various task distances by merely inserting a lens unit as shown in Fig. 7 for the particular task distance desired, yet maintaining the target unit at a fixed position. This is accomplished by the novel optical system which incorporates optical wedges to effect an optical compensation between lens separation and target separation, the principle of which will be hereinafter described. As shown in Fig. 6, the lens unit comprises a plate 50, a rear rotor 51 having peripheral detent grooves 52, a masking disc 53 to reduce reflected light, aberration and ghosts or undesired images, a front rotor 54, and an occlusion wheel 55 having detent grooves 57 in the periphery thereof. The front and rear rotors, masking disc and occlusion wheel are statically balanced and have central apertures 93 to permit rotation on an axle 56 between a pair of blocks 58, each having an inner arcuate contoured surface having a radius of curvature corresponding to that of the rotors, masking disc, and occlusion wheel. Spring detents 59 are secured to the inner arcuate surfaces of the blocks 58 and cooperate with the detent grooves 52 and 57 to position the front and rear rotors and occlusion disc in the desired predetermined settings for conducting tests. Sufficient clearance is provided between the blocks 58 and the rotors 51 and 54 of the lens unit to allow free rotation of the lens unit and engagement of the spring detents 59 in the detent grooves 52 and 57. The axle 56 is supported between the plates 50 and 60, respectively, by bolts passing through apertures in the plates and threadably engaging the ends of the axle 56 as at 56'. The plates 50 and 60, respectively, when bolted to the blocks 58 at 58' bind the assembly together and protect it from getting out of adjustment. The front and rear rotors 54 and 51, respectively, have circular apertures spaced 90° apart which may be threaded for mounting the lenses. The +5.00 diopter lenses 62 for far point testing are set on the 0°–180° axis apertures 61 in the rear rotor 51, as shown in Fig. 6. The 90°–270° apertures 63 of this rotor are left open. The +3.00 diopter lenses 64 for near point testing are set in the 90°–270° apertures 65 of the front rotor 54, and the 0°–180° apertures 94 of this rotor are left open as shown in Fig. 6. The masking disc 53 which is located between the front and rear rotors, 54 and 51, respectively, has circular openings 66 in the 0°–180° axis position and openings 67 in the 90°–270° axis position which have straight edges on three sides and are curved on the inner side of each opening. As previously described, this particular shape of opening reduces aberration, reflected light and undesired images. In the assembled condition of the lens unit, the front and rear rotors and the masking disc are secured together by bolts passing through holes 69 in the rear rotor 51 and engaging threaded holes 69' in the front rotor to prevent relative motion of these components. The occlusion wheel 55 is mounted on axle 56 for free rotation thereon independently of the assembled front and rear lens rotors, and is provided with three circular apertures 67 located to correspond with the 0°, 90°, and 270° openings in the lens rotors. This arrangement permits separately testing the right and left eye of an individual or testing both eyes simultaneously. The plate 50 and the plate 60 are each provided with apertures 68 which will be aligned with the apertures in corresponding positions in the lens rotors and occlusion disc when the lens unit and occlusion disc are separately rotated to the positions determined by the peripheral grooves 52 and 57. The lens rotor unit and occlusion wheel are clearly marked on their peripheries, Near, Far, and Right, Left, Both, respectively, so that an operator may quickly set the particular condition desired by rotating the lens rotor assembly and the occlusion wheel. For example, if it is desired to test both eyes of an individual for near point vision, for a distance determined by the optical elements of the particular lens assembly being used with the proper target unit 43 in place, the operator need only rotate the lens unit until the spring detent clicks into the peripheral groove corresponding to the indicia mark Near which will appear in a position as shown in Fig. 7 and to rotate the occlusion wheel until the spring detent clicks into the peripheral groove corresponding to the indicia mark Both which will appear in a position as shown in Fig. 7. Then, if it is desired to test for far point vision, it is only necessary to rotate the lens unit, as above, until the Far indicia mark appears in position. When the lens rotor unit is rotated to Far, the +5.00 diopter lenses which simulate a target distance of 20 feet and are fitted into the two rear cells or apertures of the rear rotor 51 are aligned with the apertures 68 of the plate 60 and the optical wedges 49. Similarly, when the rotor is turned to Near, the +3.00 diopter lenses which simulate a target distance of 13 inches and are fitted into the two front cells or apertures 65 of the front rotor 54, are aligned with the apertures 68 of the plate 60 and the optical wedges 49. Since the Far and Near lens sets are 90° apart, when one set is rotated into viewing position, the other set is rotated out of the line of sight through the apparatus. It is not necessary in changing from Near to Far point testing to change the target position since the unique feature of the apparatus makes it possible to view targets of equal magnification for both far and near point testing. By rotating the occlusion wheel in the same manner, independently of the lens unit, it is possible to test the eyes individually and simultaneously. To conduct tests for other combinations of near and far distances, it is only necessary to remove a lens unit and insert another unit which combines the particular combination of distances desired. For example, one lens unit may combine optical components to test for 13 inches and 20 feet, and another unit may combine 8 inches and 26 feet. The unique feature of the instant device which permits both near and far point testing without changing the location of the target, is due to the novel optical system including an optical wedge which effects an optical compensation between lens separation and target separation.

The lens rotor assembly introduces a new concept to the field of optical instrument maintenance. Frequent cleaning of the optical element, for example, is required. Many instruments of present construction have lens surfaces so inaccessible that cleaning becomes a factory procedure. The lens rotor assembly eliminates this costly delay. The unit can be removed and cleaned by the operator on the job without danger of getting parts out of adjustment. Further, the rotor assembly is so rugged that mechanical maintenance is practically eliminated.

In a physical embodiment of the instant device, the lens rotors were made of metal and measured $4^{11}/_{16}$ inches in diameter and were 2 inches thick. The occlusion wheel, also of metal, was slightly larger in diameter for ease in manipulation, and measured $4^{7}/_{8}$ inches in diameter and ¼ inch thick. The axle 56 carrying the lens rotors and occlusion wheel was $7/_{16}$ inch in diameter. While the parts of the lens assembly and occlusion wheel have been described as being of metal, other materials which will not introduce inaccuracies in the apparatus, such as plastic and hard rubber, may be used.

Figures 11, 12, 13, 15, 16:
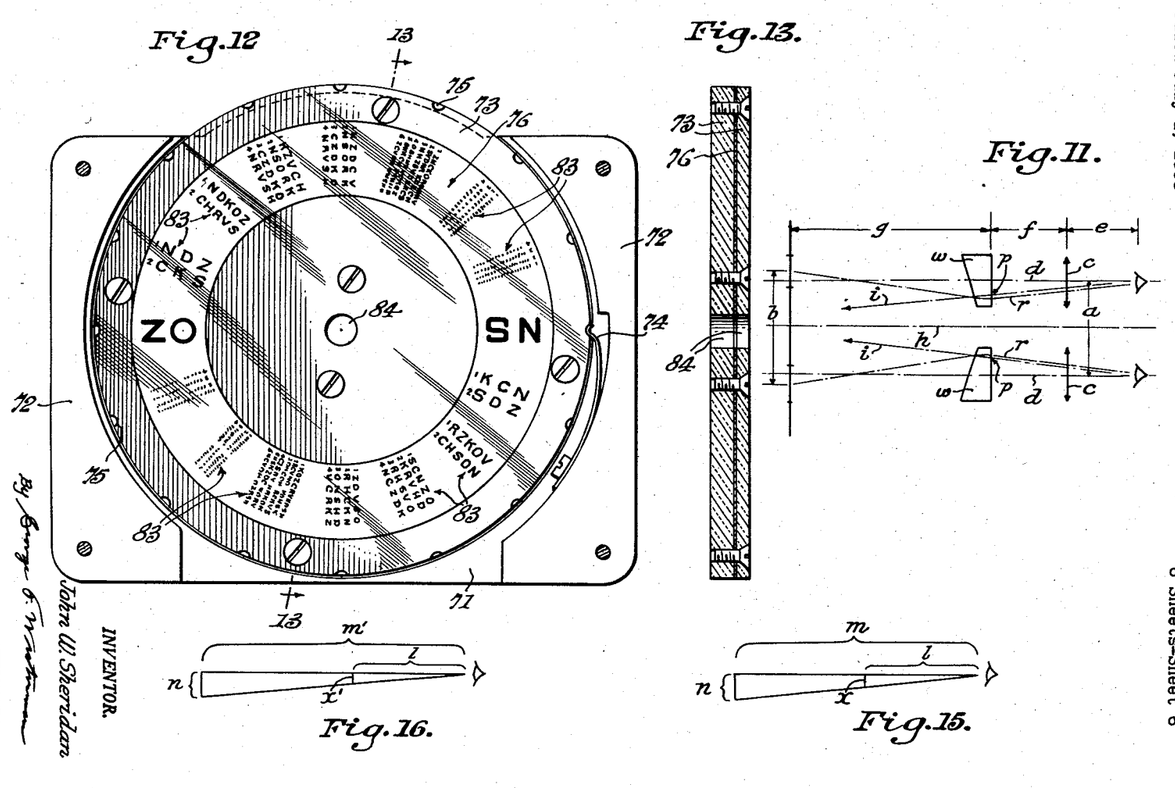
Fig. 11 is a ray diagram of the optical system of the instant invention.
Fig. 12 is an elevational view of a target.
Fig. 13 is a detailed vertical sectional view on the line 13—13 of Fig. 12.
Fig. 15 is a diagram used in connection with determining the deviation of the object ray from the visual line for near phoria.
Fig. 16 is a diagram used in connection with determining the deviation of the object ray from the visual line for distant phoria.

Reference is now made to Figs. 9 and 10 which illustrate the target unit in exploded and assembled condition, respectively. The target unit, like the lens unit, is a complete assembly which further distinguishes the instant device over other instruments in this field in that an operator can remove one target unit and insert another without making any mechanical adjustments so that an entire series of targets covering a variety of tests can be easily and quickly changed. This magazine-type loading arrangement of target units extends the range of tests which can be conducted considerably over present day testers, and therefore lends a versatility not found in present day eye testers. The target unit is placed in front of the light source 29 at a calculated distance. The housing for the target rotor comprises a plate 70 and a plate 71 which are maintained a fixed distance apart by crescent-shaped members 72. The inner arcuate surface of the members 72 has the same radius of curvature as the target discs 73, and sufficient clearance is provided to permit free rotation of the discs 73 therebetween. Secured to the curved portion of one of the crescent-shaped members 72 is a detent spring 74 which engages detent grooves 75 cut in the peripheries of the target discs 73. When the target 76, which is the same diameter as the target discs 73, is secured between the target discs 73, the operator may, by reference to the indicia 77 on the periphery of a target disc, know that a particular target is properly rotated into position. The plates 70 and 71 have openings or windows 78. The openings 78 in plate 71 are for illuminating the target 76 from the light source 29, and the openings 78 in plate 70 are for viewing the target. The central portion of one surface of the plate 70 is recessed as at 79 to accommodate a plate 80 having viewing apertures 81 in registry with the viewing openings 78. The plate 80 is provided in order that the size and shape of the openings through which the examinee views the target may be changed when the tests so require. The target discs 73 are transparent, are made of abrasive resistant plastic, and are fastened together by bolts or other convenient means passed through the holes 82 with the target 76 properly oriented between the discs 73 so that the indicia correspond properly with target symbols 83. The discs 73 and target 76 have central apertures 84 to permit free rotation of the target unit on an axle 85, which latter is held in position between the plates 70, 71, respectively, by a bolt 95 passing through a central hole 96 in the plate 80 and plate 70 which is threadably received in one end of the axle 85 and a bolt 95' passing through a central opening 97 in the plate 71 threadably received in the other end of the axle 85. Additionally, the entire unit is held together by bolts 87 passing through openings 86 in the four corners of the plate 70 and in each corner of the crescent-shaped members 72 for engagement with threaded holes, not shown, in the four corners of the plate 71. Fig. 10 shows the assembled condition of the target unit. The test targets 76 are made photographically on film for permanency and may be designed for monocular vision testing, as shown in Fig. 12, or binocular vision testing. For example, in Fig. 12 the individual sets of letters or symbols on the target are relatively distinct, whereas in the binocular targets diametrically opposed sets are alike. The film must be of photosensitive material so composed and treated that the images shall have maximum keeping qualities under storage conditions.

Cleaning is of paramount importance for reliable testing. The target discs 73 can withstand any amount of cleaning with soaps or even solutions such as carbon tetrachloride. Such cleaning methods, even with mild rubbing, would quickly obliterate the images on photographic glass plates, unprotected film and other target materials. The discs also protect the enclosed film targets from breakage, cracking, air and dampness. In this respect the target unit structure of the instant device is far superior to exposed film, photosensitive glass plates and other types of material now found in visual screening instruments. This is a distinct advantage when instruments receive hard usage.

In one physical embodiment of the instant device, the target discs 73 were $4^{7}/_{8}$ inches in diameter and the total thickness of the target discs and target was ⅜ inch. As previously described, the discs 73 of the target unit project above the cover of the view box 1 through openings 28 for manual rotation of the target. The axle 85 was $5/_{16}$ inch diameter. The target housing members, such as the plates 70, 71, respectively, and the crescent-shaped separating members 72 may be made of metal or other suitable material while the target discs preferably are made of clear plastic.

The elements of the optical system of the instant device include a pair of +5.00 diopter spheres 62 which simulate a target distance of 20 feet and a pair of +3.00 diopter sphere-prism combinations for near point testing housed respectively in the rear and front lens rotors as previously described. The +3.00 diopter sphere-prism combinations are made up as achromatic doublets to correct for color aberrations always visible in non-achromatic optical prisms. The wedge elements carried by the barrels are a pair of achromatic flat surfaced doublets, which as previously described, are calculated to effect an optical compensation between lens separation and target separation, i.e. deviations of the optical center of the near and far point lenses from the system midline, and deviations of the geometric centers of the targets from the system midline. The rotor construction permits rotation of either the +5.00 far point lenses or the +3.00 near point lenses into registry with the wedge elements depending on whether far or near vision testing is conducted, yet maintaining the target at a fixed distance. The lens rotor in effect makes this instrument a combination of two stereoscopes in one.

The ray diagram shown in Fig. 11 illustrates the relative position of the elements of the optical system and the target, and will be referred to in describing the principles upon which the novelty of the eye tester of the instant invention is based. The distance from center to center of the optical elements in a lens rotor assembly as shown by the distance $a$ in Fig. 11 is 65 millimeters, which is the average adult pupillary width, and the separation between centers of the targets for the right and left eye is 87 millimeters for a 20 foot simulation and 81 millimeters for 13 inch simulation shown by $b$ on Fig. 11. The near and far point lenses are designated by the lines $c$ in Fig. 11 representing the central plane of the lenses since the calculations involved are simplified by this expedient rather than by using surface contours of the lenses.

The compensating wedges are shown in section at $w$. In the particular embodiment previously referred to, the wedges are circular in configuration, measure 38.5 millimeters in diameter, are 24.2 millimeters at the greatest thickness and 14.5 millimeters at the least thickness which is adjacent the midline of the system.

An optical wedge will divert the path of light at an angle which is dependent upon the relative slant of its two faces. Because divergence of light rays by wedges is produced by refraction instead of reflection, a certain amount of dispersion or separation of color results from the use of wedges. For this reason achromatic wedges, composed of two different kinds of glass, i.e. flint and crown, having different indices or refraction to neutralize the dispersion, must be used where the angles through which the rays are bent are relatively large or where the work performed by the wedges is of an exacting nature. The particular combination of crown and flint glass depends upon the amount by which such dispersion must be neutralized, and in turn is dictated by the characteristics of the particular wedge. By methods well known in the art it is possible to produce wedges with the proper combination of flint and crown glass having desired characteristics, as in the instant device, to accomplish the desired neutralization of dispersed light. No detailed explanation therefore will be given as to such composition in the wedges of the instant device but only a determination of the degree of divergence desired. Even though lens assemblies are interchanged to conduct tests for different combinations of work distances, the wedge element in all the lens assemblies has the same structure. This is so because the amount of prism diopter required, or the extent of bending of the light rays required by each lens in a particular near and far vision combination lens assembly, is produced by the combined effect of orientation of the wedge about its central axis and the amount of decentering of the near and far lens elements from the viewing or optical center-line $d$ of each half of the system. Since the amount of diopter required is so obtained and relative lateral displacement of the lens elements and target is not required, the distances $e$, $f$ and $g$ on Fig. 11 which are 5 cm., 5 cm., and 15 cm., respectively, remain fixed in each lens assembly and tester.

An explanation of the principles involved in determining the amount of diopter required for a particular lens assembly, for example, to conduct tests at work distances of 13 inches and 20 feet, follows. Since the optical system is symmetrical about the midline $h$ the calculations refer to only one-half the system. Other near and far lens assemblies may be determined in the same manner as for the 13 inch-20 foot combination. The calculations are directed toward determining the amount of total diopter required for each particular near and far lens combination to be obtained from the wedge and by decentration of the lens elements. In carrying out the calculations it is necessary, with certain factors given, to determine the amount of decentration of the lenses to produce the required diopter to bring the object ray $r$ from the target to the eye and to compensate for proximal or psychological convergence, or by working forward from the eye to the lens and backward from the target to the prism to find the values which will produce a particular end result.

The values for a 13 inch image distance or a near point task distance will be determined first. The amount of deviation $x$ of the object ray $r$ from the visual level line $d$ for an image at infinity between the eye and the lens is found by proportion from Fig. 15 wherein the distance $l$ from the eye to the lens is 5 cms., the distance $m$ from the eye to the image is 13 inches or 33 cms. represented by image ray $i$ in Fig. 11, and the distance $n$ is 3.25 cms. or one-half the pupillary distance of 65 mms. (6.5 cms.) from the midline $h$ of the system to the visual line $d$. Then $x$ is found by the proportion (1) $$\frac{3.25}{33} = \frac{x}{5} \qquad 33x = 16.25$$

or (2) $\qquad x = 0.492$ cm. or 4.92 mm.

The object ray $r$ then strikes the lens $c$ at $$32.50 \text{ mm.} - 4.92 \text{ mm.} = 27.58 \text{ mm.}$$

above the midline $h$. In order to create a prismatic power of $3\Delta$ the +3.00 near point lens is decentered out 10 mm. This places the optical center of this lens 32.5 mm.+10 mm. or 42.5 mm. away from the midline $h$. It should be noted at this point that a +3.00 lens brings light to focus at 13 inches since a 1 diopter lens focuses light at 1 meter, which is about 40 inches from which the focus of a +3.00 lens is 40/3 or about 13 inches. By definition, the diopter of a lens or ability to focus light rays is equal to diopter=$1/F'$ where $F'$ is the focal length of the lens. It should be noted that a one diopter prism ($1\Delta$) will bend a ray of light 1 cm. at a distance of 1 meter. The amount of prism diopter introduced into the system by decentering the +3.00 lens 10 mm. to change the optical center at 42.5 mm. may then be determined from (4) $\qquad \Delta = DF$ where F is the power in diopters of the lens and where D represents the difference in distance from the midline $h$ to the decentered optical center of the +3.00 lens or 42.5 mm. (4.25 cm.) and the distance from the midline $h$ to the point at which the object ray $r$ impinged the +3.00 lens or 27.58 mm. (2.76 cm.) and F is +3.00. Therefore (5) $\qquad \Delta = DF = (4.25 - 2.76)(3.00) = 4.47$ Having determined the distance above the midline $h$ where the object ray $r$ strikes the lens $c$, 27.58 mm., it is next necessary to determine where the object ray $r$ will impinge the prism (wedge) 49. The refraction of the object ray $r$ through the prism 49 from the sloping side to the vertical side opposite is considered negligible, and the object ray $r$ is assumed to be drawn from the target center to the vertical side of the prism toward the eye as an unbroken line and practically coincident with the point of impingement $p$ of the image ray $i$. While a slight divergence of the rays passing through the lens $c$ takes place, the amount in the short distance of 5 cm. is negligible and not taken into account in the calculations. The target separation or distance between the centers of the right and left eye targets for a binocular target is 81 mm. for a 13 inch near phoria and consequently the distance from the midline $h$ to the center of one target is 40.5 mm. With no refraction of the object ray $r$ through the prism 49, the point of impingement $p$ with the prism is 27.58 mm. above the midline $h$. Therefore, the difference in distance above the midline $h$ from where the object ray $r$ emerges from the prism and from the target is (6)     40.5 mm.—27.58 mm.=12.92 mm.

It has previously been stated that a one diopter prism will bend a light ray 1 cm. in a distance of 1 meter. Thus, in order that a light ray may be bent 12.92 mm. or 1.292 cm. in a distance of 15 cm. or 0.15 meter, the prism diopter must be 8.6Δ. The total diopters introduced into the optical system by decentering the lens $c$ from (5) is 4.47Δ and the diopter required to bend the object ray $r$ emerging from the target and the prism is, as above, 8.6Δ. Therefore, the total diopters required is (7)     4.47Δ+8.60Δ=13.07Δ

Of this total 3Δ of prismatic power is obtained by having decentered the +3.00 lens $c$ and the balance of 10.07Δ must be made up by the wedge. In order to convert this total diopters in terms of degrees, it is necessary to refer to the relation that (8)     1Δ=1/100 radian or 0.573° since 1 radian equals 180°/π or 57.3°. Thus, a 10.07Δ wedge would be (9)     10.07×0.573=5.8° or for practical purposes may be a 6° wedge.

A description of the calculations involved for the 20 foot or distant phoria will now be given. Again, since the optical system is symmetrical, the calculations are made for half the system only. It must be noted that the drawings illustrating structural details of the device show the near and far lens separated, but the optical diagram, Fig. 11, shows the central plane of both lenses as being coincident. It has been determined that having both far and near lenses in the same plane is satisfactory from an optics standpoint, and further, the effect of considering a coincident midplane for both lenses is negligible so far as the calculations are concerned. It may be desirable at times, however, to separate the lenses as shown in the structural drawings. Again, the amount of deviation $x'$ of the object ray $r$ from the visual line $d$ for an image at infinity between the eye and the lens is found by proportion from Fig. 16 wherein the distances as given for Fig. 15 are the same, but the distance $m'$ from the eye to the image is 20 feet or 610 cm. represented by image ray $i$ in Fig. 11. Then $x'$ is found by proportion as follows:

(10)     $\frac{3.25}{610}=\frac{x'}{5}$;  610$x'$=16.25 or     $x'$=0.0266 cm. or 0.266 mm.

The object ray $r$ for a distance phoria then strikes the lens $c$ at
    32.50 mm.—0.27mm.=32.23 mm.

above the midline $h$. In order to create a prismatic power of 1.25Δ, the +5.00 far point lens is decentered in 2.5 mm. This places the optical center of this lens 32.5 mm.—2.5 mm. or 30 mm. away from the midline $h$.

The amount of prism diopter introduced into the system by decentering the +5.00 lens 2.5 mm. to change the optical center to 30 mm. may then be determined from (4) above, as follows:

(11)     Δ=DF=(3.22—3.00)(5.00)=1.10Δ

Again having determined the distance from the midline $h$ where the object ray $r$ strikes the lens $c$, 32.23 mm., it is then necessary to determine where the object ray $r$ will impinge the prism (wedge) 49. The same assumptions regarding refraction of the ray $r$ through the prism 49 as made in the 13 inch calculations will again be made.

The target separation for a binocular target is 87 mm. for a 20 foot distant phoria, and therefore the distance from the midline $h$ to the center of one target is 43.5 mm. With no refraction of the object ray $r$ through the prism 49, the point of impingement $p$ with the prism is 32.23 mm. above the midline $h$. Therefore, the difference in distance above the midline $h$ from where the ray $r$ emerges from the prism and from the target is (12)     43.5 mm.—32.23 mm.=11.27 mm.

In order that a light ray such as $r$ may be bent 11.27 mm. or 1.13 cm. in a distance of 15 cm. or 0.15 meter, the prism diopter would have to be 7.6Δ. The total diopters introduced into the optical system by decentering the lens $c$ from (11) is 1.10Δ and the diopter required to bend the object ray $r$ emerging from the target and the prism is, as above, 7.6Δ, therefore, the total diopters required is (13)     1.10Δ+7.6Δ=8.70Δ

From the near phoria calculations, 13 inches, it was determined that a wedge of 10.07Δ was required to compensate the bending of the object ray $r$ by decentering of the lens $c$ and to bend the ray $r$ where it emerged from the target and the prism. In the 20 foot or far phoria, as above, 8.70Δ must be compensated. The wedge of 10.07Δ therefore will provide the required diopters and further since there is an excess of prismatic power as follows—

(14)     10.07Δ—8.70Δ=1.37Δ the effects introduced by proximal convergence, which is a psychological convergence introduced by the examinee, will also be compensated by the optical system. As previously pointed out, other near and far combinations of lenses and prisms may be determined by the procedures outlined above.

The instant eye-testing apparatus duplicates the conditions of the conventional eye-lane but has the advantages of portability and versatility. For example, on the conventional Snellen chart, the big "E" or 20/200 letter subtends an angle of 50' at the standard test distance or an angular size in radians of 0.0145. To determine the size of the 20/200 letter at 20 feet or 610 cms. the following relation is used:

(Angular size in radians) x (distance), which equals from the data above (15)     0.0145×610=8.8 cm.=88 mm.

By means of the apparatus, with an object size of 2.9 mm. for the 20/200 letter and a magnification of 30 (i.e. image distance/object distance, 610/20) the image size of the 20/200 letter in the apparatus of the instant invention will be (16)     2.9×30=87 mm.

Similarly, for the near phoria, the magnification will be 1.65 (image distance/object distance, 33/20) resulting in an image size in the apparatus for the 20/200 letter of (17)     2.9×1.65=4.78 mm.

The size of the 20/200 letter at 13 inches or 33 cm. is determined as before in (15) as follows:

(18)     33×0.0145=0.478 cm.=4.78 mm.

or the same as in (17).

Having thus described my invention, what I claim as new and wish to secure by Letters Patent is:

1. An eye-testing apparatus comprising a box having horizontally aligned viewing apertures in one end wall thereof, means adjustably supporting said box, headrest means adjustably supported externally on said box adjacent said viewing apertures, a unitary assembly removably supported transversely within said box adjacent one end thereof and including a rotatable target, means mounted within said box for illuminating said target, a unitary optical assembly removably supported transversely within said box rearwardly in spaced relation to said unitary assembly including the rotatable target, said unitary assembly and said unitary optical assembly having a common center line, said unitary optical assembly including a pair of similar rotors and stationary optical compensating means, means mounting said rotors coaxially for stepped rotation and said unitary optical assembly positioned to interpose said stationary optical compensating means between said rotatable target assembly and said pair of rotors, a pair of lenses mounted in spaced relation in each of said rotors along a diameter thereof and aligned for viewing said rotatable target through said viewing apertures, the lenses in a first one of said pair of rotors simulating a far test distance and angularly displaced a predetermined amount from the pair of lenses in a second one of said pair of rotors simulating a near test distance, said optical compensating means effecting a correction in the deviations of the optical centers of the near and far pairs of lenses and the geometric centers of the target from said common center line when said pairs of lenses are selectively rotated into registering position with said optical compensating means, whereby light rays from said target are directed through the selectively rotated lenses to said viewing apertures while maintaining said target a constant distance from said viewing apertures for near and far vision test distances.

2. An eye-testing apparatus comprising a hollow chamber, one wall of said chamber constituting a cover, viewing apertures at one end of said chamber, a base adjustably supporting said chamber, vertically disposed light shield means carried by said chamber and projecting beyond said one end including said viewing apertures for limiting external illumination reaching said viewing apertures, a spring biased headrest assembly adjustably carried by said light shield means exteriorly of said chamber adjacent said viewing apertures and including a flat top member normal to the viewing end of said chamber and side members inwardly of said light shields and depending from said flat top member, the forwardly projecting edge of said flat top member being curved inwardly, a padding member secured to said projecting edge and formed to simulate a forehead contour, spring strip members having an arcuate configuration in transverse section, said spring members being each secured at one end adjacent the upper edge of the viewing end wall of said chamber, spindle means carried by said side members beneath said secured ends of said springs for receiving an opposite end of each of said springs, said springs being reeled on said spindles when moving said headrest, said side members having arcuate slots vertically arranged, guide pins carried by said light shields and projecting inwardly thereof for sliding engagement in said arcuate slots, said guide pins and arcuate slots restricting movement of said headrest assembly relative to said hollow chamber in an arcuate path, said spring means maintaining said headrest assembly stationary in predetermined position, a target assembly including a rotatable target housed adjacent to one end of said chamber and slidably removable from within said chamber, a unitary removable optical system including pairs of lens elements and optical compensating means at an opposite end of said chamber adjacent to said viewing apertures, transverse partition means separating said optical system and said target assembly and provided with openings therein, support means for said optical system, guide means for slidably removing said support means for said optical system as a unitary structure from within said chamber, said support means including axially aligned rotor members for carrying and selectively revolving said pairs of lens elements into optical alignment with said optical compensating means and into the visual path between said target and said viewing apertures, said optical compensating means directing object rays from said target through the lens elements of said optical system to said viewing apertures for far and near test distances, the distance from said target to said viewing apertures remaining fixed for far and near vision tests, occluding means carried by said support means for rotation relative to said rotor members and positioned between said compensating means and said revolving lens elements of said optical system, illuminating means disposed rearwardly of said target, and light diffuser means positioned between said target and said illumination means.

3. An eye-testing apparatus comprising a hollow chamber having viewing apertures in one end thereof, headrest means exteriorly carried by said chamber adjacent said viewing apertures, means for adjustably supporting said hollow chamber, transverse partition means dividing said chamber into forward and rear compartments, cover means for said chamber, a first target cartridge containing a unitary rotatable transparent target, vertically grooved guide means secured to the inner surfaces of the side walls of said chamber in the rear compartment thereof for slidably engaging and positioning said first cartridge transversely of said chamber, a second cartridge containing pairs of lens elements and prism elements mounted on said second cartridge for optical alignment with said lens elements, guide means secured to the inner surfaces of the side walls of said chamber in the front compartment thereof for slidably engaging and positioning said second cartridge transversely of said chamber, said second cartridge having a shaft, a pair of circular axially aligned rotors separated by a circular masking disc of similar diameter, and an occlusion wheel, said rotors and said masking disc having pairs of spaced apertures located on normally disposed diameters of said rotors and said masking disc, said occlusion wheel having a plurality of holes therein but having one less hole than the number of holes in said rotors and said disc, said rotors and said masking disc being joined with said holes in registering relation and mounted for simultaneous free rotation on said shaft, said occlusion wheel mounted adjacent to one of said rotors on said shaft for free rotation thereon relative to said joined rotors, whereby upon such relative rotation holes in said rotors may be selectively exposed, said pairs of lens elements comprising a lens element mounted in each of a pair of diametrically opposite holes in a first one of said pair of rotors and a lens element mounted in each of a pair of diametrically opposite holes in a second one of said pair of rotors angularly displaced from said pair of holes in said first one of said pair of rotors, enclosing means for said assembled rotors and said occlusion wheel including first and second mutually spaced end plates supporting said central shaft therebetween, detent grooves circumferentially arranged on said rotors and said occlusion wheel to correspond with the holes therein, spring detents secured to interior surfaces of said enclosing means for engagement with said detent grooves to permit rotation of said rotors and said occlusion wheel to predetermined positions, said prism elements being carried by said first plate in fixed position thereon, the holes in said rotors and said occlusion wheel registering with said prism elements upon rotation of said rotors and said occlusion wheel, said second plate having viewing apertures therein aligned with said holes in said rotors, said occlusion wheel and said prism elements, said prism elements providing sufficient prismatic power to compensate for deviations in object rays between said target and said viewing apertures produced by separation of optical centers of said lens elements from a center line between said target and said viewing apertures for variable distance vision testing for a predetermined fixed distance from said viewing apertures to said target, illuminating means positioned rearwardly of said target, and means for varying the level of illumination, said cover means having openings therein, said second cartridge and said first cartridge projecting through said cover openings for external adjustment of said target, said occlusion wheel and said lens elements.

References Cited in the file of this patent

UNITED STATES PATENTS

| | | |
|---|---|---|
| 275,348 | Berteling | Apr. 10, 1883 |
| 777,867 | Thomson | Dec. 20, 1904 |
| 1,201,657 | Walman | Oct. 17, 1916 |
| 1,543,188 | Poser | June 23, 1925 |
| 2,091,173 | Wottring | Aug. 24, 1937 |
| 2,481,582 | Ellis | Sept. 13, 1949 |
| 2,485,272 | Freeman | Oct. 18, 1949 |
| 2,573,546 | Costenbader et al. | Oct. 30, 1951 |
| 2,635,502 | Richards | Apr. 21, 1953 |
| 2,795,993 | Leverett et al. | June 18, 1957 |
| 2,798,408 | Ellis et al. | July 9, 1957 |